United States Patent [19]

Roesgen

[11] Patent Number: 4,800,524

[45] Date of Patent: Jan. 24, 1989

[54] MODULO ADDRESS GENERATOR

[75] Inventor: John P. Roesgen, Easton, Mass.

[73] Assignee: Analog Devices, Inc., Norwood, Mass.

[21] Appl. No.: 127,579

[22] Filed: Dec. 2, 1987

Related U.S. Application Data

[63] Continuation of Ser. No. 811,679, Dec. 20, 1985, abandoned.

[51] Int. Cl.$^4$ .......................... G06F 12/00; G06F 7/00
[52] U.S. Cl. ..................................... 364/900; 364/200
[58] Field of Search ... 364/200 MS File, 900 MS File

[56] References Cited

U.S. PATENT DOCUMENTS

| | | | |
|---|---|---|---|
| 3,461,433 | 1/1967 | Emerson | 364/200 |
| 4,251,860 | 2/1981 | Mitchell et al. | 364/200 |
| 4,408,274 | 10/1983 | Wheatley et al. | 364/200 |
| 4,432,054 | 2/1984 | Gaither et al. | 364/200 |
| 4,453,209 | 6/1984 | Meltzer | 364/200 |
| 4,453,212 | 6/1984 | Gaither et al. | 364/200 |

Primary Examiner—Gareth D. Shaw
Assistant Examiner—Adolfo Ruiz
Attorney, Agent, or Firm—Wolf, Greenfield & Sacks

[57] ABSTRACT

An address generator for generating addresses for target locations in a circular buffer of length L, the buffer having an upper boundary and a lower boundary, the lower boundary being at an address which is a multiple of an integer power of two, and the address of a target location being offset by M locations from a current buffer location at address A, where M is no longer than L. The apparatus comprises a set of three registers, an adder for generating an absolute address, an adder/subtractor for generating a wrapped address which maps the absolute address into the buffer address space when the absolute address is outside that space, and certain control logic for selecting as the target address either the absolute address or the wrapped address. The contents of the three registers represent, respectively, the length of the buffer, the current address designated by the pointer, and the offset from the current buffer address to the target location in the buffer. The adder generates the absolute address by adding the current address of the pointer to the offset. The adder/subtractor generates the wrapped address by either adding to the absolute address or subtracting from the absolute address the length of the buffer, depending on the direction of the offset. Logic operating on the carry bits from the adder and from the adder/substractor detects the generation of an absolute address outside the boundaries of the buffer and provides as the target address the wrapped address instead of the absolute address.

5 Claims, 2 Drawing Sheets

MODULO ADDRESS GENERATOR

This application is a continuation of application Ser. No. 811,679 filed Dec. 20, 1985, now abandoned.

FIELD OF THE INVENTION

This invention relates to the field of digital buffers and, more particularly, to the generation of addresses for accessing digital buffers. Even more particularly, the invention relates to the generation of addresses for accessing circular buffers.

BACKGROUND OF THE INVENTION

Buffers are used in many situations to provide elastic storage between processes or pairs of devices such as input/output devices. One type of buffer which is of particular interest in certain applications (for example, delay lines for digital filters and coefficient buffers for digital signal processing applications) is the so-called "circular" buffer, which is also called a "ring" buffer.

In general, buffers may be implemented in a number of ways. For example, a buffer may be realized as one or more hardware registers wired together; or it may simply be a bounded area in a larger memory which, under software control, is dedicated to performing the buffering operation. In either case, when the buffer is constrained to be of the circular variety, it is addressed in a very specific manner. Namely, an addressing algorithm forces an incrementing of the highest address in the buffer to wrap around to the lowest address, and a decrementing of the lowest address to wrap around to the highest address. Thus, in terms of addressing, a closed loop is formed.

Depending upon its use, the locations in a buffer may be accessed consecutively or in a random order or other non-consecutive pattern. Thus, the accessing of a buffer typically requires some mechanism for generating the successive buffer locations to be addressed. As each buffer address is generated, it is stored in a specific register or memory location (outside the buffer) which is reserved for that purpose. Such a register or memory location is referred to as a pointer register. Each time the buffer is to be accessed, the contents of the pointer register (i.e., the pointer) are modified in some way (e.g., by being incremented or decremented a specified amount), to establish the address for the next buffer-accessing operation.

Normally, a buffer has a finite size limitation, so some means must be employed to ensure that the address indicated by the pointer is always within the memory allocated to the buffer. Otherwise, an attempt will be made to write information to or read information from a memory location or register other than the one intended; if that happens, the integrity of the memory is lost. This can destroy the information which otherwise would have been in that location and cause the information which should have been written into a buffer location to be lost, or cause unpredictable system operation. One key to addressing a circular buffer, therefore, is to provide some mechanism for detecting an attempt to cause the buffer pointer to exceed the addressing boundaries of the buffer. If possible, some kind of adjustment can then be made to bring the address indicated by the pointer back within the range of addresses allocated to the buffer.

With a circular buffer, software techniques generally are employed to force the address following the highest address to be the lowest address in the buffer. Similarly, the next lower address which follows the lowest buffer address is constrained to be the highest buffer address. These software address-mapping techniques require several instruction cycles to perform the necessary address comparisons, arithmetic operations and replacement of the pointer's contents. Such software address mapping, however, is not fast enough for certain types of uses. Applications such as digital filters, Fast Fourier transforms, matrix manipulations, and other common digital signal processing routines require a very rapid generation of memory references. It is of little benefit to provide fast signal processing apparatus if the apparatus must spend a good part of its time idle, waiting to be supplied with addresses for reading or writing data.

A significant object of the present invention, therefore, is to provide fast, efficient address generation for a circular buffer.

Another object of the invention is to provide a simple, fast hardware system for generating addresses for accessing a circular buffer.

A further object of the invention is to provide address generation apparatus which allows successively accessed buffer locations to be separated by an arbitrary number of address locations.

SUMMARY OF THE INVENTION

These various objects and goals are met in the present invention by circuitry which provides fast, simple and efficient generation of addresses in an arbitrary modulus, L, corresponding to the length of the circular buffer in words or bytes. The apparatus allows the address of each successive location to be accessed in the buffer (referred to herein as "target addresses") to be an arbitrary distance from the address of the immediately preceeding location which was accessed. Thus, it accommodates random access of buffer locations as well as consecutive (i.e., stack-type) addressing.

The address generator comprises a set of three registers, a ripple-carry adder for generating an absolute address, a ripple-carry adder/subtractor for generating a wrapped address which maps the absolute address into the address space within the boundaries of the buffer, and certain control logic for selecting as the target address either the absolute address or the wrapped address. The contents of the three registers represent, respectively, the length of the buffer, the current address designated by the pointer, and the offset from the current buffer address to the target address. The adder generates the absolute address by adding the current address of the pointer to the offset. The adder/subtractor generates the wrapped address by either adding to the absolute address or subtracting from the absolute address the length of the buffer, depending on the direction of the offset. Logic operating on the carry bits from the adder and from the adder/subtractor detects the generation of an absolute address outside the boundaries of the buffer and provides as the target address the wrapped address instead of the absolute address.

The invention is pointed out with particularity in the appended claims. The above and further objects, features and advantages of the invention may be better understood by referring to the following detailed description, which should be read in conjunction with the accompanying drawing.

DETAILED DESCRIPTION OF AN ILLUSTRATIVE EMBODIMENT

Figure 1:
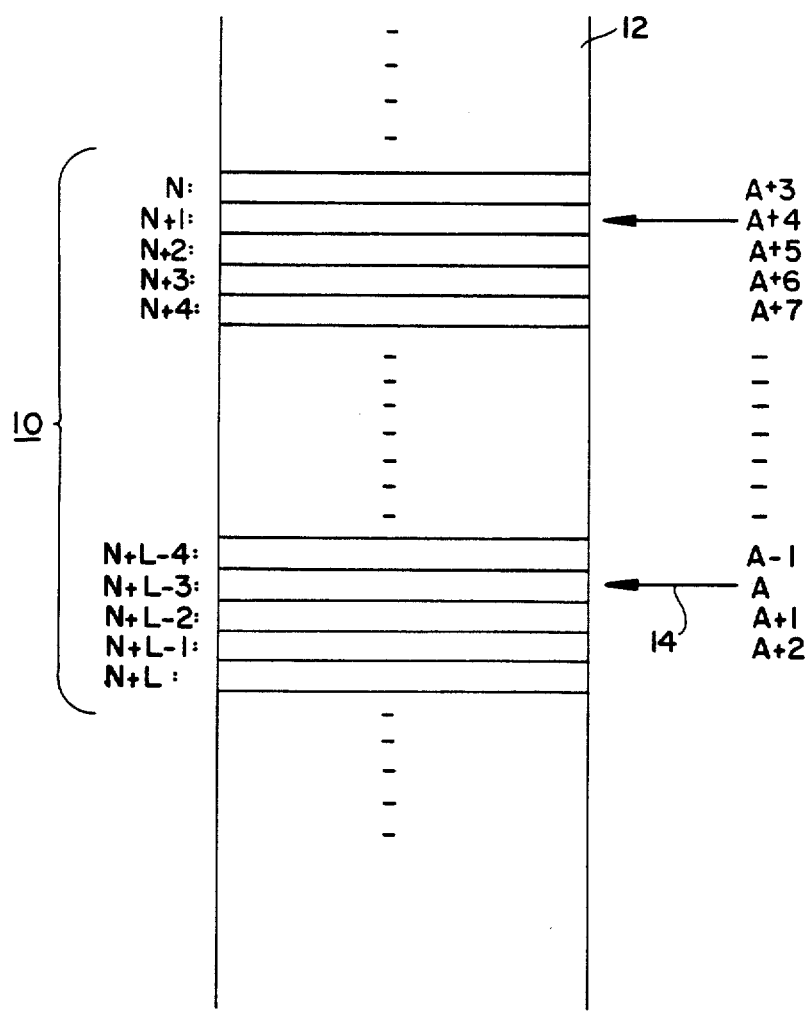
FIG. 1 is a diagrammatic illustration of a portion of memory in which a circular buffer is implemented.

With reference now to FIG. 1, a portion 10 of a larger memory 12 contains a circular buffer which is L words (or bytes) long, starting at address N. A register (not shown), which is referred to as a "pointer," contains the "current" address in the buffer 10 for a read or write operation. This current address is represented by the letter "A" and the pointer function is represented by the arrow 14.

Assume the pointer register points to address $N+L-3$ (that is, the address A in the pointer register A is the value $N+L-3$). If a 1 is added to this pointer value, it will then point to address $N+L-2$. However, if a 6 is added to the current pointer address A, then it should point to address $N+3$, not to address $N+L+3$, since the latter is outside the address space of the buffer. That is, $$[(L-3)+6] \text{ modulo } (L) = 3$$

or $$N + [(L-3)+6] \text{ modulo } (L) = N+3.$$

Thus, the pointer should wrap around from the end of the buffer (i.e., the highest address, $N+L-1$) to the beginning of the buffer (i.e., the lowest address, N), effectively creating the new address modulo L with base address N.

Such addressing is, of course, conventional for circular buffers. However, the modulo arithmetic is generally performed in software.

A circuit (shown in FIG. 2) has been developed for implementing this modulo addressing directly. The operation of the circuitry rests upon two assumptions: First, the lower K bits of the buffer's base address N must be 0, where K represents the number of bits required to represent the length of the buffer. In other words, address N must be a multiple of an integer power of two; thus, the lower boundary of the buffer is at an address $C2^M$, where C and M are integers. Second, the offset value (i.e., the distance to the next address) must never be larger than L, where L represents the buffer length. These two assumptions greatly simplify the necessary circuitry without diminishing its usefulness for digital signal processing applications.

Figure 2:
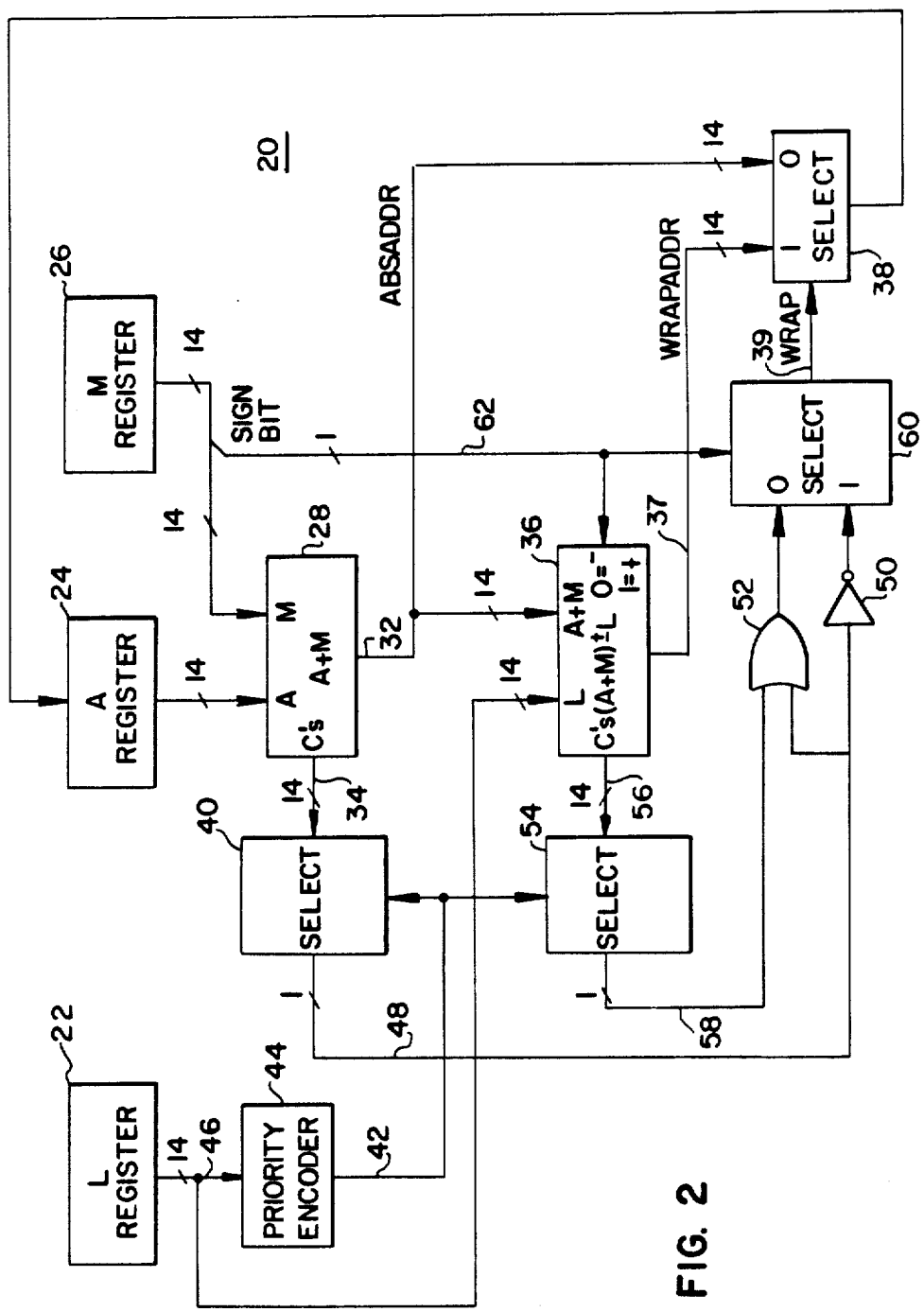
FIG. 2 is a part schematic circuit, part block diagram of a modulo address generator according to the present invention.

The address generator 20 of FIG. 2 utilizes three registers 22, 24 and 26. The L register 22 holds the length of the buffer, L, in words or bytes (whichever convention is adopted). The A register 24 is the pointer register; it holds the current buffer location "A" for reading or writing. The M register 26 holds the offset which will modify the A register 24 for the next access. That is, it contains the distance, in terms of the number of buffer locations, to the next buffer entry of interest. In the illustration, buffers 22, 24 and 26 are all indicated as being 14 bits wide, but the size of the registers may be varied according to requirements. Registers of other sizes can readily be employed.

An understanding of the operation of the circuit 20 of FIG. 2 rests upon appreciation of the fact that the upper and lower boundaries of buffer 10 (and all of the intermediate locations in the buffer) must fall between a pair of addresses which correspond to multiples of powers of 2. That is, the lowest address N in the buffer is a multiple of an integer power of 2 (e.g., and there is some higher multiple of the same power of 2 (e.g., $(C+1)2^M$) which lies beyond the highest address in the buffer. The circuit detects when the modification of a current address causes the next address to "cross" one of these boundaries.

Adder 28 computes the sum of the contents of the A register 24 and the M register 26. This sum represents the next address to be accessed; it may or may not lie within the buffer limits.

The adder 28 is implemented with ripple-carry logic. It therefore generates as its output a set of sum bits on lines 32 and a set of carry bits on lines 34. The sum output on line 32 is provided to an adder/subtractor 36 and to a selection circuit 38. The adder/subtractor 36 subtracts the value L from the raw, unmodified address, to provide the modified or "wrapped" address. The selection circuit 38 supplies to A register 24 the next buffer address. This address will be the address generated by adder 28 if neither buffer boundary was crossed, or the "wrapped" address from adder/subtractor 36 if either boundary was crossed.

Selection circuit 38 is controlled by a WRAP signal supplied on line 39. When the WRAP signal is a 1, the output of selection circuit 38 is the WRAP address generated by adder/subtractor 36; and when the WRAP signal is a 0, the output of the selection circuit 38 is the absolute (or raw) address generated by the adder 28. The circuitry for generating the WRAP signal comprises a pair of selection circuits 40 and 54, a so-called priority encoder 44, an inverter 50, an OR-gate 52 and another selection circuit 60.

The operation of the control circuitry for generating the WRAP signal is as follows. Priority encoder 44 receives as its input on lines 46 the 14-bits of the contents of L register 22 and supplies, as its output on line 42, a signal which identifies the bit position of the most significant 1 in the contents of the L register. Responsive to that output signal from priority encoder 44, the selection circuit 40 picks out (from the carry bits on lines 34 from adder 28) the carry output bit which is from the same bit position as the most significant 1 in the L register. The selected carry bit is provided on line 48 to inverter 50 and to one input of OR-gate 52. The output of inverter 50 constitutes a signal indicating whether the new absolute address has crossed the lower boundary of the buffer's memory area, when the offset is negative. Selection circuit 54 operates in the same way as selection circuit 40, and is also under the control of the output of priority encoder 44. Thus, selection circuit 54 picks out that carry output bit from adder/subtractor 36 which is from the same relative bit position as the most significant 1 in the L register. OR-gate 52 provides the logical OR of the selected carry bits from the adder 28 and adder/subtractor 36, supplied on lines 48 and 58, respectively. The output of OR-gate 52 indicates whether the new absolute address has crossed the upper boundary of the buffer, when the offset is positive. Selection circuit 60 chooses the output of inverter 50 or OR-gate 52 responsive to the sign bit of the M register 26, supplied on line 62, to produce the WRAP signal on line 39. The WRAP signal indicates whether the new absolute address lies within the circular buffer's addressing range without modification.

If the next address is intended to be "higher" than the present address, the sign bit in register M is 0, representing a positive offset. It the next address is intended to be "lower" than the present address (the offset is negative) then the sign bit in register M is 1, representing a negative offset. The sign bit from register M is fed into the selection circuit 60 via line 62. If the sign bit on line 62 is a 0, then selection circuit 60 selects the input from OR gate 52 and places it on its output line 39. If the sign bit is a 1, selection circuit 60 selects the input from inverter 50 and places it on its output line 39.

The output of OR gate 52 is a 1 if the upper boundary of the buffer was crossed and a 0 if not. Similarly, the output of inverter 50 is a 1 if the lower boundary was crossed and a 0 if not. Therefore, the WRAP signal 39 is a 1 if (1) the offset is positive and the upper boundary is crossed or (2) the offset is negative and the lower boundary is crossed. As stated above, a 1 on WRAP signal line 39 instructs select circuit 38 to output the WRAP ADDR signal 37. A 0 on line 39 instructs select circuit 38 to output the absolute address signal ABS ADDR 32.

Adder/subtractor 36 generates, as the wrapped address, either the sum of its input or their difference, depending upon the state of the sign bit from the M register 26. If that sign bit is a 0, the two inputs are subtracted and the output on line 37 becomes $(A+M-L)$; if the sign bit is 1, the wrapped address on line 37 becomes $(A+M+L)$.

Having thus described an exemplary embodiment of the invention, it will be apparent that various alterations, modifications, and improvements will readily occur to those skilled in the art. For example, differing circuit elements may be employed to achieve the same operation. Such obvious alterations, modifications and improvements, though not expressly described above, are nevertheless intended to be implied and are within the spirit and scope of the invention. Accordingly, the foregoing discussion is intended to be illustrative only, and not limiting; the invention is limited and defined only by the following claims and equivalents thereto.

What is claimed is:

1. Apparatus for generating an address for accessing a target location in a circular buffer of length L bytes, the target location being offset by M locations from a current buffer location at address A, the buffer having an upper address boundary and a lower address boundary, the lower address boundary having an address which is a multiple of an integer power of two, the offset M being no larger than L, such apparatus comprising:
   a. means for generating an absolute address of the target location;
   b. means for generating a wrapped address for the target location;
   c. means for generating a wrap control signal in a first state responsive to the absolute address of the target location being outside the boundaries of the buffer and in a second state responsive to the absolute address of the target location being within the boundaries of the buffer; and
   d. means for selecting as the address of the target location the absolute address responsive to the wrap control signal being generated in the second state and for selecting as the address of the target location the wrapped address responsive to the wrap control signal being generated in the first state.

2. The apparatus of claim 1 wherein the means for generating a wrapped address comprises means for adding to the absolute address of the target location the length of the buffer, L, when the absolute address of the target location is less than the lower address boundary of the buffer and for subtracting from the absolute address of the target location the length of the buffer, L, when the absolute address of the target location is greater than the upper address boundary of the buffer.

3. Apparatus for generating an address for accessing a target location in a circular buffer of length L, such address being termed a target address, the buffer having an upper address boundary and a lower boundary, the lower boundary being at an address which is a multiple of an integer power of two, and the target address of the target location being offset by M locations from a current buffer address A, where the offset M is no larger than the buffer length L, such apparatus comprising:
   a. means for forming an absolute address equal to the current buffer address A plus the offset M;
   b. means for forming a wrapped address equal to the absolute address less the length of the buffer when the absolute address exceeds the upper address boundary of the buffer and for forming a wrapped address equal to the absolute address pulse the length of the buffer when the absolute address is less than the lower address boundary of the buffer; and
   c. means for selecting as the target address the absolute address when the absolute address is neither less than the buffer's lower address boundary nor greater than the buffer's upper address boundary, for selecting as the target address the wrapped address when the absolute address is outside one of the buffer address boundaries.

4. Apparatus for generating an address for accessing a target location in a circular buffer of length L, such address being termed a target address, the buffer having an upper address boundary and a lower address boundary, the lower address boundary being an address which is a multiple of an integer power of 2, and the target address of the target location being offset by M locations from a current buffer address A, where M is no larger than L, such apparatus comprising:
   a. means for providing a summation of the current buffer address and the offset M, as an absolute address;
   b. means for providing a first wrapped address equal to the sum of the absolute address and the length of the buffer;
   c. means for providing a second wrapped address equal to a difference formed by subtracting from the absolute address an amount equal to the length of the buffer; and
   d. means for selecting as the target address one from among the group containing (i) the absolute addresses, (ii) the first wrapped address and (iii) the second wrapped address.

5. Apparatus for generating an address for accessing a target location in a circular buffer of length L, such address being termed a target address, the buffer having an upper address boundary and a lower address boundary, the lower address boundary being an address which is a multiple of an integer power of 2, and the target address being offset by M locations from a current buffer address A, where M is no larger than L and includes a sign bit indicating the direction of the offset from the current buffer address A, such apparatus comprising:

a. a register holding a binary word representing the length of the buffer, such register being termed the L register.

b. a ripple-carry adder for generating a summation of the current buffer address A and the offset M, said summation being termed an absolute address;

c. means for providing as a direction control signal, the sign bit of the offset M;

d. an adder/subtractor which provides a wrapped address by adding the summation from the ripple-carry adder to the binary word in the L register in response to a direction control signal being provided in a first state and by subtracting the binary word in the L register from the summation from the ripple-carry adder in response to the direction control signal being provided in a second state;

e. the adder/subtractor also outputting on a separate set of lines, the carry bit corresponding to each sum bit;

f. means for selecting as a first boundary-crossing signal the carry bit from the ripple-carry adder which is from the same bit position as the most significant one (i.e., 1) in the binary word in the L register;

g. means for selecting as a second boundary-crossing signal the carry bit from the adder/subtractor which is from the same bit position as the most significant one (i.e., 1) in the binary word in the L register;

h. means responsive to the direction control signal for generating a wrap control signal by inverting the first boundary-crossing signal when the direction control signal is in a first state and logical-ORing the first and second boundary-crossing signals a when the direction control signal is in a second state; and i. means responsive to the wrap control signal for selecting as the target address the absolute address when the wrap control signal is in a first state and for selecting as the target address the wrapped address when the wrap control signal is in a second state.

* * * * *